United States Patent
Fuhrmann et al.

(10) Patent No.: US 7,940,874 B2
(45) Date of Patent: May 10, 2011

(54) RECEIVER WITH ADAPTIVE STROBE OFFSET ADJUSTMENT

(75) Inventors: Peter Fuhrmann, Aachen (DE); Jörn Ungermann, Aachen (DE); Manfred Zinke, Aachen (DE); Klaus Peter May, Aachen (DE)

(73) Assignee: NXP B.V., Eindhoven (NL)

( * ) Notice: Subject to any disclaimer, the term of this patent is extended or adjusted under 35 U.S.C. 154(b) by 744 days.

(21) Appl. No.: 11/913,211

(22) PCT Filed: Apr. 25, 2006

(86) PCT No.: PCT/IB2006/051287
§ 371 (c)(1),
(2), (4) Date: Oct. 31, 2007

(87) PCT Pub. No.: WO2006/117721
PCT Pub. Date: Nov. 9, 2006

(65) Prior Publication Data
US 2008/0205565 A1    Aug. 28, 2008

(30) Foreign Application Priority Data

May 2, 2005 (EP) .................................. 05103629
Sep. 1, 2005 (EP) .................................. 05108019

(51) Int. Cl.
*H04L 7/00* (2006.01)
(52) U.S. Cl. ... 375/355; 370/321; 365/193; 365/230.03; 713/400
(58) Field of Classification Search .................. 375/355; 370/321; 713/400; 365/230.03, 193
See application file for complete search history.

(56) References Cited

U.S. PATENT DOCUMENTS

| 4,998,264 | A | 3/1991 | Woodward |
| 5,905,763 | A | 5/1999 | Kamikubo |
| 6,577,167 | B1 | 6/2003 | Soda |
| 6,628,735 | B1 | 9/2003 | Belotserkovsky et al. |
| 6,671,074 | B2 | 12/2003 | Akashi |
| 6,715,094 | B2 * | 3/2004 | Jacobs ........................ 713/400 |
| 6,957,382 | B2 | 10/2005 | Budde et al. |
| 7,159,135 | B2 * | 1/2007 | Jacobs ........................ 713/400 |
| 2002/0085657 | A1 | 7/2002 | Boerstler |

FOREIGN PATENT DOCUMENTS

| CN | 1435037 A | 8/2003 |
| EP | 1313258 A2 | 5/2003 |
| JP | 62-168442 A | 7/1987 |
| JP | 2-027850 A | 1/1990 |
| JP | 10-145439 A | 5/1998 |
| JP | 2001-136157 A | 5/2001 |
| WO | 01/59982 A1 | 8/2001 |

OTHER PUBLICATIONS

Office Action in Japanese Patent Appln. No. 2008-507260, w/ English translation (Sep. 21, 2010).

* cited by examiner

*Primary Examiner* — Ted M Wang

(57) ABSTRACT

Receiver for receiving a data stream via a data bus, which receiver samples the bits of the data stream in an over-sampling process, in which n bit strobe offsets are used and n data sets with i bits are sampled,—applies a decision criterion for identifying those data sets with correct bit values. This decision uses checksum CRC,—selects one of the identified data sets with correct bit values and—uses the bit strobe offset, which was used for receiving the selected data streams, for receiving the data stream. In this way the multiphase clock with optimal phase shifts is selected.

14 Claims, 2 Drawing Sheets

RECEIVER WITH ADAPTIVE STROBE OFFSET ADJUSTMENT

Figure 1:
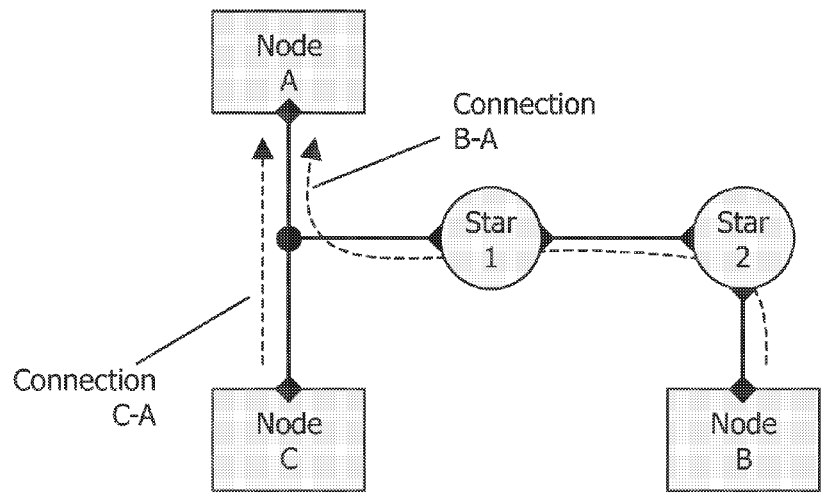

The invention relates to a receiver for receiving a data stream via a data bus. Bits, which are received, are sampled with a certain bit strobe offset, which could also be regarded as the phase offset of the sampling. This strobe offset influences the correctness of the received data bits very much.

Most wired communication systems in the automotive domain use baseband transmission techniques. Communication protocols like CAN or FlexRay, which is known from EP133258A1, use an NRZ-based coding scheme, adding some information for clock recovery at the receiver side. Especially under automotive environmental conditions, such signal transmissions are exposed to heavy disturbances and bit stream distortions given by the harsh channel characteristics.

Bit stream decoder circuits used in such systems comprise the following basic elements: bit stream over-sampling, (optional) glitch filtering, initial synchronization to the sampled and filtered bit stream, bit value strobing, recurring bit synchronization throughout reception process. The combination of these functions shall result in a robust bit value reconstruction of the original transmitted bit sequence at the receiver. The overall decoding performance, i.e. bit stream reconstruction in the presence of bit distortions (e.g. prolonged bit levels through delayed signal edges), has to match the given worst case channel properties.

Existing automotive communication protocols (like CAN, FlexRay) do not use error correction codes, thus any receiving of a wrong bit value for a single bit (=bit error) invalidates the whole frame transmission. In order to protect the frame transmission against undetected bit errors, CRC techniques are commonly used. The CRC checksum is appended by the transmitter and is then used after reconstruction of the frame bits to validate the received data at the receiver's side.

Typically, the bit distortion caused by the channel characteristics consists of a static portion (e.g. caused by asymmetric delays for rising and falling signal edges) and a variable, dynamic portion (e.g. caused by EMI). Existing decoding schemes use a fixed strobe offset related to a detected bit edge in order to select the sample determining the respective bit value. Such a fixed strobe offset is well suited for communication channel with a homogenous distortion characteristic, which differs only to small extend for any point-to-point connection. This assumption does not hold for communication channels that incorporate active elements (like star couplers) or exhibit quite asymmetric topology attributes.

It is therefore an object of the present invention to indicate a receiver which is less sensible to distortions of the received signal.

The object of the present invention is achieved by receiver according to claim 1:

Receiver for receiving a data stream via a data bus, which receiver
- samples the bits of the data stream in an over-sampling process, in which m bit strobe offsets are used and n data sets with i bits are sampled,
- applies a decision criterion for identifying those data sets with correct bit values,
- selects one of the identified data sets with correct bit values and
- uses the bit strobe offset which was used for receiving the selected data stream for receiving the data stream.

The present invention is mainly based on the idea not to use a fixed strobe offset when sampling the bits of the data stream, but to use a variable offset which is adapted for optimal receiving behavior. The bits received are sampled with a variety of strobe offsets. If a data set has i bits and m data sets are received, these m×i bits are sampled with n different strobe offsets. As the data bits of at least some of the data sets are either known or can be checked concerning their correct value (for example by using error detection techniques, CRC) those strobe offsets that were used for the reception of the data sets with the correct bit values can be identified. Among these strobe offsets one strobe offset is selected for receiving the data stream.

As selection processes for selecting one strobe offset out of those strobe offsets that have led to a correct reception of the data values can advantageously be one of the processes according to claims 3, 4, 5 or 6.

An advantageous criterion for identifying data sets whose bits have been received correctly is using a checksum of the data bits according to claim 2.

Further improvements, advantages and features of the present invention are explained below in more detail with reference to a preferred embodiment by way of example and to the accompanying drawings, which show FIG. 1 a diagram of a data bus connection between three nodes, partly via star-couplers, FIG. 2 a scheme indicating the selection of a strobe offset in a receiver according to the invention, FIG. 3 a block diagram of a receiver according to the invention and FIG. 4 a timing diagram showing the reception of several data sets and indicating the used strobe offsets.

FIG. 1 indicates three nodes A, B and C which can exchange data via a data bus. The connection between nodes C and A is a direct one and does not incorporate any other elements that might lead to a jitter of the bits of the data stream exchanged between these two nodes.

In contrary, the connection between nodes A and B has two star couplers, which are active elements that may introduce jitter or asymmetric behavior. Connections routed via one or two star coupler are exposed to distortions of particular characteristics that are different from the distortions affecting a direct connection via a passive link (s. FIG. 1: connection C-A). Support of such network configurations and topology variants is, for instance, specified for FlexRay communication systems.

For those systems the static portion of the effective bit distortion might differ between maximum positive (=lengthening) and negative (=shortening) bit distortion for any connection, i.e. from one frame reception to next frame reception. A decoding scheme based a fixed strobe offset cannot be ideally chosen for any connection so that always maximum edge jitter tolerance is ensured.

These problems are overcome by the receiver according to the invention, which uses a variable bit offset and thus adapts to difficult conditions.

In order to determine an optimized strobe offset value for each connection (=frame transmission), this invention proposes an intelligent strobe offset adjustment mechanism (primarily for FlexRay communication systems). This strobe adjustment can also be regarded as a phase adjustment of the sampling process, i.e. the moment at which a sample is taken within a bit-range. If for example the received data stream is sampled with eight-times over-sampling, each bit is sampled eight times, or in other words: with eight different strobe offsets. The main idea of the invention is not to use a fixed strobe offset (i.e. not values of fixed sampling points) for the entire network, i.e. for connections between various transmitters and receivers, but to use a variable strobe offset, which is adapted to the received data stream for a particular connection.

The FlexRay standard prescribes frame format and coding scheme for data transmission. Thus, any acceptable solution, which determines the distortion characteristics for current (=on-going) frame transmission has to rely on the given frame format.

Additional bit sequences or pattern cannot be introduced without violating the FlexRay standard specification.

Therefore, this invention proposes to utilize existing frame segments and elements in order to determine the optimized strobe offset setting to be applied for current reception. The FlexRay frame format has a leading header segment (5 bytes), followed by a specific header CRC (=HCRC), the frame payload data segment (up to 254 bytes) and a concluding frame CRC (=FCRC).

The incoming signal is sampled (e.g. n-times per bit time) and glitch filtering and bit cell alignment (=bit stream re-synchronization) is performed according to state-of-the-art principles (→refer to FlexRay standard). This invention proposes to strobe the assumed bit cell at each available sample offset per bit (e.g. 1 to n). These samples are stored in distinct queues for each strobe offset, i.e. n queues exists for n-times over-sampling. The entire header segment is processed this way, i.e. the number of header bits determines the depth of these queues. These queues represent the 'data base' that is needed to determine actual static bit distortion, i.e. the edge delay affecting the current frame transmission. The HCRC check is applied to each queue and is used to validate the strobed (i.e. sensed) bit sequences contained in the header queues. Typically, the HCRC is correct for more than one strobe offset value, represented by the related queue and its bit sequence.

In order to determine the optimal strobe offset value to be applied to the remainder of the incoming frame, a decision function is applied. This decision function selects a single strobe offset value according to the HCRC check results. The selected strobe offset value is used to determine (and save) a single value to represent the actual bit value for the rest of the frame reception. The header bits are taken from the queue associated to the selected strobe offset value.

To store such a-priori knowledge for each connection at each node is extremely costly (memories, network characterization for each set-up to be measured and configured to each node) and therefore not acceptable.

The basic solution elements are:
glitch filtering and bit alignment strategy e.g. as specified in FlexRay PS v2.0
n-times over-sampling is applied (e.g. n=8)
each of the n samples per bit are fed into own queues (→n queues)
  queue_1 holds 'strobe' value sampled with strobe offset 1,
  queue_2 holds 'strobe' value sampled with strobe offset 2, . . .
  queue_n holds 'strobe' value sampled with strobe offset n
all frame bits until last bit of header CRC are handled this way
  e.g. for FlexRay 40 bits→n*40 values, buffered in n queues a 40 values
  (BSS bits could be disregarded already at this stage (or during HCRC calculation; s. next step))
header CRC is (concurrently) calculated for each of the n queues vector containing n HCRC results (true/false; corresponding to strobe offset queue) is constituted→HCRC_strobe_vector
decision on strobe offset setting is determined and applied to the incoming frame bits until end of frame reception
decision is based on HCRC_strobe_vector; potential assessment algorithm:
  eliminate all consecutive <false> values from top and bottom
  select entry in the middle of the remaining values; the corresponding strobe offset is the ideal setting for the current connection (i.e. the channel between transmitter and receiver)
  special cases:
    all values <false>; header CRC failed for all possible strobe offset setting→frame reception is aborted
    remaining vector entries after removing outer values not all <true>→ignore, i.e. select strobe offset according to aforementioned mid-term algorithm
    chosen value is <false>→different reactions are conceivable:
      alternative (a)
      take this strobe offset anyway (as long as at least on entry in vector is true); header bits are taken from a queue for which the HCRC has been passed
      alternative (b):
      select neighbored strobe offset value (if <true>)
      alternative (c):
      judge HCRC to be failed for this frame
  bit values for the frame header strobed with selected strobe offset value are preserved; values from other queues can be dismissed
Alternative decision strategies are:
Decision Algorithm A:
  give weights to specific strobe offset indices
In order to achieve a robust decoding, the strobe offset typically is positioned close to the ideal middle of the bit cell. Sporadic edge jitter and disturbances within the reception period of the header bits might cause some entries in the resulting HCRC_strobe_vector to be set to <false>, i.e. the CRC check for the corresponding queue failed. This might lead to a shift of the strobe offset as result of the unweighted mid-term algorithm that does not correspond to the real static distortion situation for the current frame reception. By putting a weight distribution to the n entries of the HCRC_strobe_vector, the selected strobe offset values can be drawn towards the ideal sample point.
  Advantage: mitigate influence of dismissed strobe offset values due to sporadic/dynamic edge jitter
Decision Algorithm B:
  check, which distortion 'trend' is stronger (on which side are more <false> values in HCRC_strobe_vector)
  eliminate only on the 'stronger' side and do mid-term selection based on the remaining indices
  Advantage: mitigate influence of dismissed strobe offset values due to sporadic/dynamic edge jitter
Decision Algorithm C:
  check HCRC_strobe_vector at default strobe offset index, e.g. 5
  if HCRC has failed for default strobe offset, choose closest index that worked
  Advantage: definitely better or equal performance compared to state-of-the-art approach (with unique offset for all connection; refer to FlexRay Standard)

Figure 2:
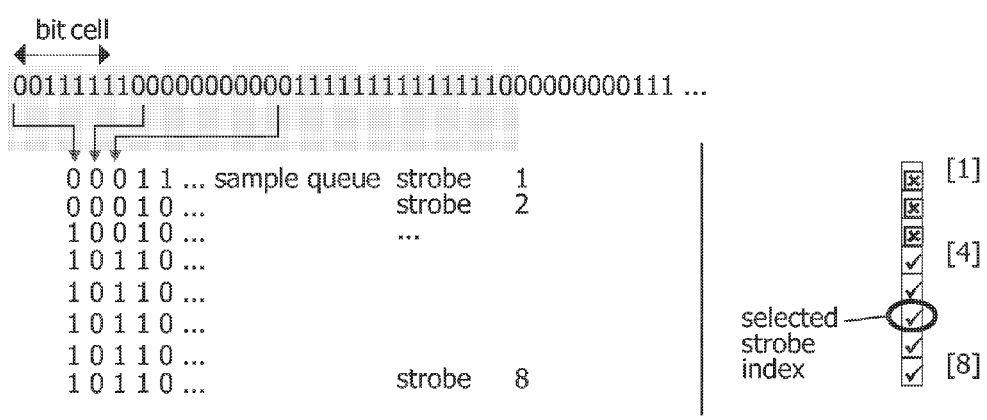

FIG. 2 shows an example for how a receiver according to the invention works for an over-sampling rate of n=8 and for some data bits. It shows how a certain bit is sampled eight times with different strobe offsets. The first row in the left part of the figure shows, that the first bit is sampled these eight times, so that eight sampling results are gathered, in this example 0 0 1 1 1 1 1 1. This procedure is continued with further bits; in the figure the next four rows show the sampling results for the next four bits.

Having these saving sampling results, a decision criterion is used to select that strobe offset that delivers the right bit value. An advantageous criterion may for example be a checking of the checksums. In the example in FIG. 2 the first five bits sampled the first three bit offsets have different values and also other values than those sampled with the last five strobe offsets, which deliver the same result 10110. In this example the checksum will show that only the data bits sampled with the last five strobe offsets have the correct value, so that the last five strobe offsets are candidates for the strobe offset to be selected. Now the receiver, which uses a decision algorithm for selecting a data set from those identified data sets with correct bit values, may use an algorithm selecting the data set that is located in the middle of the identified data sets. The strobe that had been used for sampling this data set is then selected as strobe offset and used for sampling the following bits. This is indicated in the right part of FIG. 2.

Figure 3:
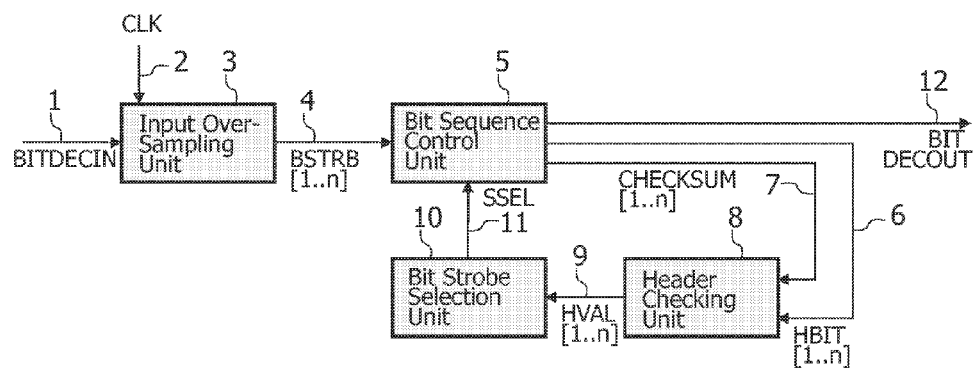

FIG. 3 shows a block diagram of a receiver according to the invention with a input over-sampling circuit 3, a bit sequence control 5, a header checking unit 8 and a bit strobe selection unit 10. Below will be described how this receiver works, especially, in which way an optimal bit strobe offset is selected.

Input to the input over-sampling unit 3 is the input signal BITDECIN, which is entering the bit decoding unit. The input over-sampling unit 3 is responsible for creating the bit strobe vector BSTRB 4 as an output signal to the bit sequence control unit 5. The over-sampling clock of the bit decoding unit CLK 2 is used to take n samples per bit cell. For each bit cell a vector is delivered containing n samples potentially determining the bit value for that bit cell.

The bit sequence control unit 5 is responsible for storing these vectors in corresponding queues. These queues are used for the following purposes:
 the incoming frame information has to be buffered, since based on the check and selection results, one of the queues related to the selected sample offset index SSEL 11 has to be provided as part of the output of the bit decoding unit afterwards
 the first part of an incoming frame, e.g. the header for which a check criterion (header check sum CHECKSUM 7, e.g. CRC) exists, is prepared for the checking algorithm; in case additional stuff information has been inserted by the transmitter (e.g. for bit stream synchronization, not belonging to the source information for the checking algorithm), these bits are removed
 the received header check sum CHECKSUM 7 is delivered to the header checking unit with proper timing, so that the header check sum unit could compare the check sum results calculated for the header bits with the received vector.

These prepared header bits are provided to the header checking unit (7) via the signal port HBIT 6. All samples taken for the corresponding header bit are provided to the checking unit with each HBIT vector delivery.

Furthermore, the bit sequence control unit is responsible for the final decoded bit sequence delivery to the output signal port BITDECOUT 12. Dependent on the SSEL signal 11, the corresponding queue is forwarded to the output port. For the remainder of the incoming data stream each bit value is chosen according to the bit strobe offset index given by the SSEL signal and which is used as fixed value for the entire frame reception. A continuous and proper bit sequence delivery comprising the header sequence used for strobe index adjustment and the remainder of the received frame has to be ensured. This could be accomplished by buffering the remainder of the frame until the header bit sequence has been streamed out to the BITDECOUT port. This will cause a reception delay determined by the header length. Alternative approaches could rely on memory-mapped access granted to a frame processing unit connected to the bit decoding unit. The bit decoding unit would simply point to the valid queue with the header bits and the remainder of the frame could be accessed at a different place in memory.

The header checking unit 8 gets via the HBIT port access to the buffered samples for all header bits. For each queue (1 . . . n) comprising a sampled value for all header bits, the check sum, e.g. CRC is calculated. In addition, the header checking unit receives for each queue calculation the received header check sum (e.g. header CRC field for the FlexRay protocol)—again, corresponding for each sample number (1 . . . n) a dedicated vector. For all queues the header checking unit will compare the calculated check sum for the sampled header bits with the received header check sum (sampled wit the same sample offset). The outcome is stored in the header valid vector HVAL 9, which provides for each sample queue an entry indicating whether the header check was passed (e.g. entry is coded as '1') or not ('0'). The header check is passed, if the header check sum calculated over the received bit samples matches the corresponding received header check sum.

Based on the header valid vector, the bit strobe selection unit 10 determines the strobe offset index for the current frame reception, signalled to the bit sequence control unit via the SSEL port. The strobe offset index determines which sample out of the n samples taken per bit cell should determine the logic bit value for further frame processing in the receiver. If for instance the strobe offset index is set to 5 (SSEL=5), the bit sequence control unit will forward the buffered header bit samples taken as the $5^{th}$ sample (out of 1 . . . n) per bit cell to the bit decoding unit (BITDECOUT port (12)). Furthermore, the corresponding received header check sum is selected and together with the continuously received remainder of the frame (each bit value determined by the now fixed strobe offset index—e.g. 5.) is given to the BITDECOUT port.

In order to determine the most suitable strobe offset index, i.e. select the sample per bit cell that represents the originally transmitted bit value with highest probability even under heavy bit stream distortion conditions, the following selection algorithms are proposed:
 The receiver uses a decision algorithm for selecting a data set from those identified data sets with correct bit values, the algorithm selecting the data set that is located in the middle of the identified data sets.
 The receiver uses a decision algorithm for selecting a data set from those identified data sets with correct bit values, the algorithm selecting the data set that is determined by averaging over weighted bit strobe offsets which correspond to the identified data sets.
 The receiver uses a decision algorithm for selecting a data set from those identified data sets with correct bit values, the algorithm canceling those data sets of the identified data sets, which have been sampled at that end of the offset variation of the sampling process, in which more wrong data sets appear than on the other end, and selecting the data set that is located at a middle-position of the remaining data sets.

The receiver uses a decision algorithm for selecting a data set from those identified data sets with correct bit values, the algorithm selecting a data set p of the identified data sets sampled with a predefined strobe-value, if its bit values are correct, and otherwise selecting the data set with correct bit values sampled with the closest strobe value to the strobe value of data set p.

More complex selection strategies are conceivable which would implement more than one decision algorithm, e.g. 3 out of the presented set, and check for consensus or perform a voting on the results to determine which strobe offset index to choose. Still, one of these algorithms could have priority over the others, if no majority can be found.

Figure 4:
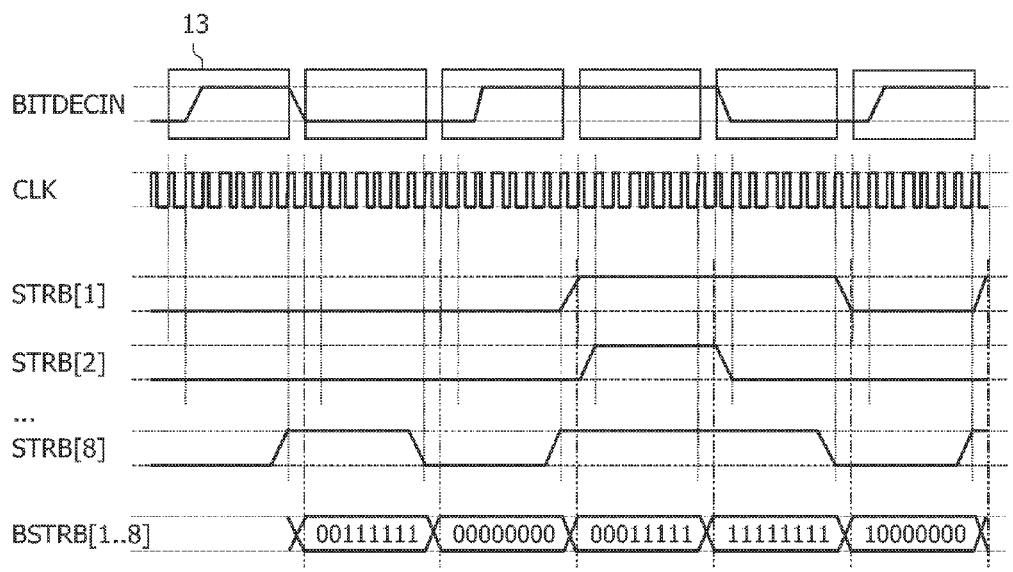

FIG. 4 shows a timing diagram that illustrates the processes described above.

A bit stream synchronization circuit, as known from prior art determines the bit cell alignment, indicated by the bit cell window 13 in FIG. 4. For example, FlexRay proposes regular synchronization edges within the data stream, ensured by special byte start pattern with predefined level change from logic one to logic zero. From this information, the start of next byte is derived and the bit cell window is steadily applied until next re-synchronization of the byte start. The re-synchronization might lead to some discontinuities in sample counting and the construction of the bit strobe vector BSTRB 4 for those parts of the incoming bit stream that are used for bit stream re-synchronisation (e.g. byte start sequence bits in FlexRay). As this 'stuff' information is removed from the frame content anyway prior to further information processing (e.g. by the header checking unit (8)), the impact is not considered further for this example. This impact of re-synchronization regarding the bit sample handling has to be handled by the input sampling unit (3) or bit sequence control unit (5), respectively.

This example does not include means for input signal filtering against noise. This can be achieved by analog means preconnected to the bit decoding unit, i.e. affecting the input signal BITDECIN 1, or by algorithms processing the oversampled signal within the bit decoding unit. This functionality could be added without affecting the general subject of this invention.

List of Reference Numerals:
 1 Bit Decoder Unit Input (BITDECIN)
 2 Sample Clock of Bit Decoder Unit (CLK), n times over-sampling
 3 Input Over-Sampling Unit
 4 Bit Strobe Vector (BSTRB[1 . . . n])
 5 Bit Sequence Control Unit
 6 Header Bit Vector (HBIT[1 . . . n]
 7 Received Header Check Sum (CHECKSUM[1 . . . n])
 8 Header Checking Unit
 9 Header Valid Vector (HVAL[1 . . . n]); corresponds to CRC_strobe_vector
 10 Bit Strobe Selection Unit
 11 Strobe Selection Signal (SSEL); corresponds to 'selected strobe offset index'
 12 Bit Decoder Unit Output (BITDECOUT)
 13 Bit Cell Window (containing n samples per bit)

The invention claimed is:

1. Receiver for receiving a data stream having a plurality of bits via a data bus, comprising:
 a sampler which performs an over-sampling process on the bits of the data stream, in which n bit strobe offsets are used and m data sets with i bits are sampled,
 an identifier which applies a decision criterion to identify those data sets with correct bit values,
 a selector which selects one of the identified data sets with correct bit values,
 wherein the receiver uses the bit strobe offset which was used for receiving the selected data stream for receiving the data stream.

2. Receiver according to claim 1, which uses a transmitted checksum as the decision criterion for identifying the data sets with correct bit values.

3. Receiver according to claim 1, which uses a decision algorithm for selecting a data set from those identified data sets with correct bit values, the algorithm selecting the data set that is located in the middle of the identified data sets.

4. Receiver according to claim 1, which uses a decision algorithm for selecting a data set from those identified data sets with correct bit values, the algorithm selecting the data set that is determined by averaging over weighted bit strobe offsets which correspond to the identified data sets.

5. Receiver according to claim 1, which uses a decision algorithm for selecting a data set from those identified data sets with correct bit values, the algorithm canceling those data sets of the identified data sets, which have been sampled at that end of the offset variation of the sampling process, in which more wrong data sets appear than on the other end, and selecting the data set that is located at a middle position of the remaining data sets.

6. Receiver according to claim 1, which uses a decision algorithm for selecting a data set from those identified data sets with correct bit values, the algorithm selecting a data set p of the identified data sets sampled with a predefined strobe value, if its bit values are correct, and otherwise selecting the data set with correct bit values sampled with the closest strobe value to the strobe value of data set p.

7. Receiver according to claim 1 for receiving a data stream according to the FlexRay standard, which receiver uses the bits of the header CRC of the data stream for the selection of the best strobe offset value.

8. A method for receiving a data stream having a plurality of bits via a data bus, comprising the steps of:
 sampling the bits of the data stream in an over-sampling process, in which n bit strobe offsets are used and m data sets with i bits are sampled,
 applying a decision criterion to identify those data sets with correct bit values,
 selecting one of the identified data sets with correct bit values, and
 using the bit strobe offset which was used for receiving the selected data stream for receiving the data stream.

9. The method according to claim 8, further comprising:
 using a transmitted checksum as the decision criterion for identifying the data sets with correct bit values.

10. The method according to claim 8, further comprising:
 using a decision algorithm for selecting a data set from those identified data sets with correct bit values, the algorithm selecting the data set that is located in the middle of the identified data sets.

11. The method according to claim 8, further comprising:
 using a decision algorithm for selecting a data set from those identified data sets with correct bit values, the algorithm selecting the data set that is determined by averaging over weighted bit strobe offsets which correspond to the identified data sets.

12. The method according to claim 8, further comprising:
 using a decision algorithm for selecting a data set from those identified data sets with correct bit values, the algorithm canceling those data sets of the identified data sets, which have been sampled at that end of the offset variation of the sampling process, in which more wrong data sets appear than on the other end, and selecting the data set that is located at a middle position of the remaining data sets.

13. The method according to claim 8, further comprising: using a decision algorithm for selecting a data set from those identified data sets with correct bit values, the algorithm selecting a data set p of the identified data sets sampled with a predefined strobe value, if its bit values are correct, and otherwise selecting the data set with correct bit values sampled with the closest strobe value to the strobe value of data set p.

14. The method according to claim 8 for receiving a data stream according to the FlexRay standard, which method uses the bits of the header CRC of the data stream for the selection of the best strobe offset value.

* * * * *